United States Patent
Pecchio

[15] 3,683,542
[45] Aug. 15, 1972

[54] ANTI-FOULING SINKER ASSEMBLY FOR FISHING LINES

[72] Inventor: Rafael Pecchio, 4ta Calle, Con Av Andres Bello 13, Los Palos Grandes, Caracas, Venezuela

[22] Filed: Feb. 10, 1971

[21] Appl. No.: 114,143

[52] U.S. Cl....................................43/44.97
[51] Int. Cl..................................A01k 95/00
[58] Field of Search.....43/43.12, 43.13, 44.97, 44.92

[56] References Cited

UNITED STATES PATENTS

| | | | |
|---|---|---|---|
| 1,182,822 | 5/1916 | Volk | 43/44.97 |
| 2,109,693 | 3/1938 | Gaines et al. | 43/44.97 |
| 2,573,981 | 11/1951 | Nelson | 43/44.97 X |
| 2,798,332 | 7/1957 | Garrison | 43/44.97 |
| 3,135,065 | 6/1964 | Cromoga | 43/44.97 X |
| 3,229,408 | 1/1966 | Kohfield | 43/43.12 X |

Primary Examiner—Samuel Koren
Assistant Examiner—George M. Yahwak
Attorney—Samuel Meerkreebs

[57] ABSTRACT

A sinker comprising a weighted body member having a relatively rigid bridle element pivotally connected about a transverse axis to the forward end of the body member, the bridle continuing as a relatively stiff or rigid leader including connection means for connection to a fishing line, and a resilient band connected between the trailing end of the body member and said connection means, said body member being pivotal about said bridle when striking an obstruction upon retrieval from a body of water and causing the resilient band to be tensioned whereby the body member "skips" or inverts over obstructions; and said body member including a flat "undersurface" whereby the rigid leader normally projects upwardly from the body member when the latter rests on the "bottom" to orient a fish hook above the "bottom."

5 Claims, 5 Drawing Figures

Patented Aug. 15, 1972
3,683,542
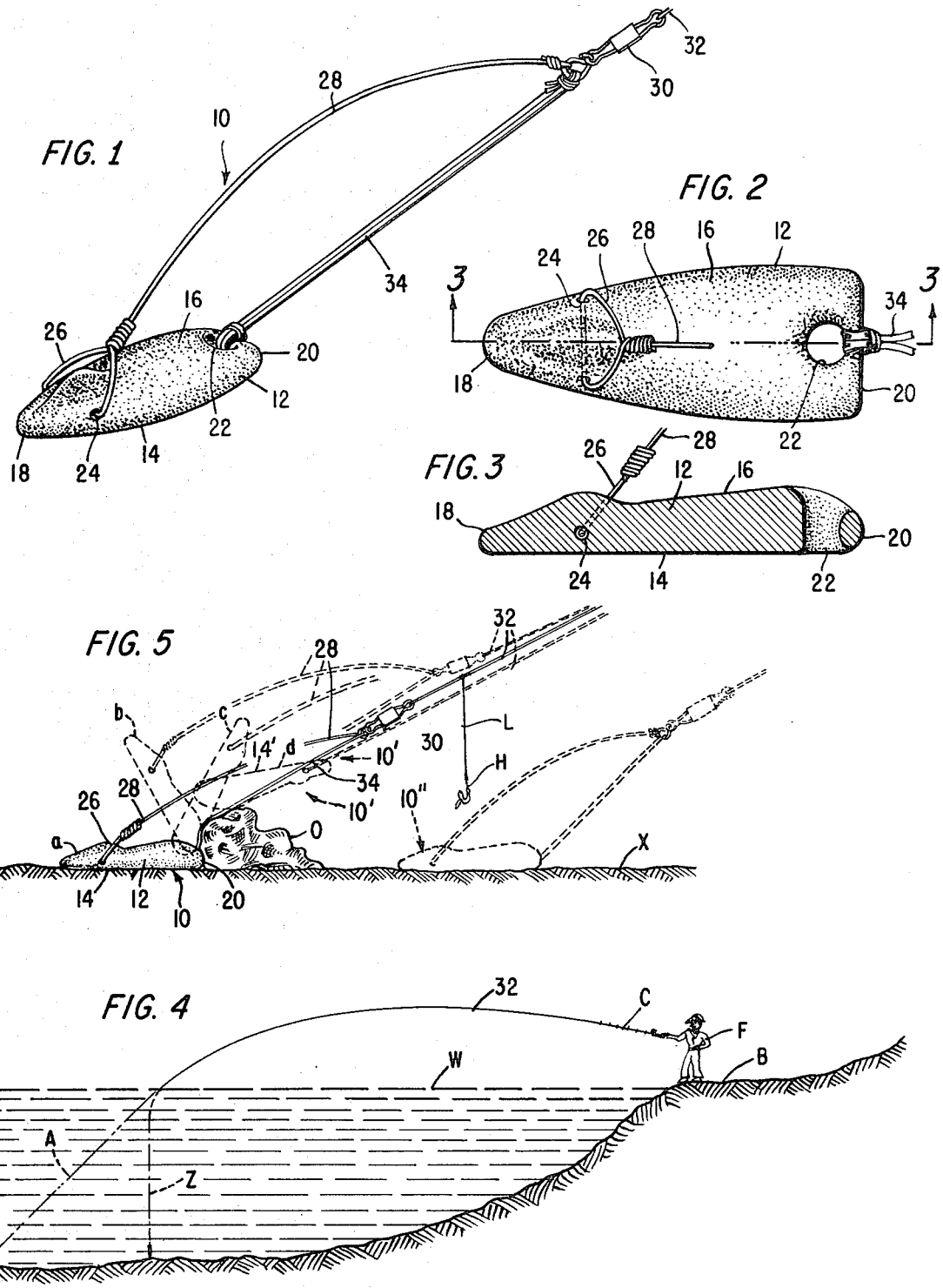
INVENTOR
RAFAEL PECCHIO
BY
Samuel Meerkreebs
ATTORNEY

ANTI-FOULING SINKER ASSEMBLY FOR FISHING LINES

PRIOR ART GENERALLY

Snagging of sinkers, hooks, etc. have been a constant source of irritation to fishermen. Fishermen are constantly modifying their equipment, and typical anti-fouling devices are shown in U.S. Letters Patent to Gaines et al., Nos. 2,109,693, and Nelson 2,573,981, for example.

BRIEF SUMMARY OF THE INVENTION

Primary objects of the present invention are:

To provide a novel anti-fouling sinker for use on fish line;

to provide a novel anti-fouling sinker which orients a hook and leader at an optimum position;

to provide a novel anti-fouling sinker which has a configuration to attain good distance after entering a body of water;

to provide a novel anti-fouling sinker which automatically "skips" or inverts over obstructions beneath a body of water and automatically attains optimum orientation in the body of water.

These together with other and more specific objects and advantages will becomes apparent from a consideration of the following description of an exemplary embodiment when taken in conjunction with the drawing forming a part thereof, wherein:

IN THE DRAWING

FIG. 1 is a perspective view of the novel sinker assembly;

FIG. 2 is a fragmentary, enlarged top plan view of the assembly;

FIG. 3 is a section taken on the plane of line 3—3 of FIG. 2;

FIG. 4 is a diagrammatic view illustrating the attitude of the sinker assembly when cast as compared with conventional sinkers; and FIG. 5 is a fragmentary, diagrammatic side elevational view, illustrating by phantom lines how the sinker assembly functions when retrieved and strikes an obstruction, and also illustrating the attitude of a fish hook and leader during normal fishing.

DESCRIPTION OF AN EXEMPLARY EMBODIMENT

Referring to the drawing in detail, and first considering FIGS. 1–3, a sinker assembly is indicated generally at 10 and comprises a body member 12, preferably, but not necessarily, of lead or the like, the body member having a flat bottom 14 and a generally rounded top 16 tapered or converging to a forward end 18. The rear or trailing end 20 of the body member is relatively wide. Formed in the rear end, centrally of the body member, is a vertical, generally relieved opening 22, and extending transversely through a forward, intermediate portion in a bore 24.

A relatively rigid bridle 26, produced from a non-corrosive wire, for example, is pivotally connected in the transverse bore 24 and the bridle 26 continues as a rigid arcuate leader 28 which is connected to one eye portion of a two-eyed connector 30, the other eye portion of the connector being connected to the terminal end of a fishline 32.

Connected in the vertical opening 22 of the body member is one end of a resilient band 34, the upper end of which being connected to the same eye portion of the two-eyed connector 30 as is the rigid leader 28.

The resilient band 34 is generally taut as seen in FIG. 1; however, if the rear edge 20 of the body member 12 is pivoted about the bridle 26, the band 34 is placed under further tension (illustrated in FIG. 5 and to be described).

OPERATION

Referring to FIG. 4, a fisherman F is standing on the bank B of a body of water W and has cast the line 32 by means of a casting rod-and-reel assembly C. The line 32 has connected thereto the sinker assembly 10 of the invention, and due to the "submarine" or streamlined shape, the line is theoretically drawn to the forward, angular path A due to the momentum of the sinker of the invention, contrary to the short vertical theoretical path Z afforded by conventional sinkers.

As seen in FIG. 4, the sinker body 12, due to its flat bottom 14, rigid leader 28 will generally orient the fish line 32 in angular relation from the sinker, when slack is taken up. The leader L of a baited fish hook H will be suspended above the bottom X of the body of water into which the sinker 10 has been cast.

Assuming an obstruction O is in the water on the bottom X, as the line 32 is retrieved and the sinker assembly is drawn into shore, the rear end 20 of the body 12 engages the obstruction O, as seen in FIG. 5. Continued tension on the line 32 through connector 30 and rigid leader 28 causes the body 12 to pivot about bridle 26 and move end-for-end to the inverted position shown at 10', i.e., progressively from positions $a$ through $d$, where the body 12 is inverted over the obstruction O. As the inverting occurs, the resilient band 34 is further tensioned, and after the obstruction is passed, the body 12 is urged to the normal position shown at 10'' due to arcuate leader 28 and release of tension in band 34. It will be observed that when the sinker assembly is inverted to position 10', the tapered end 18 is disposed rearwardly in the direction toward which the sinker assembly is being retrieved and thus will tend to pass or not be caught on obstructions.

It will be noted that the bridle 26 is so dimensioned that when pivoted rearwardly, the rigid leader 28 will be disposed at an acute angle with respect to the bottom 14 of the body member, see FIG. 5.

What is claimed is:

1. A sinker assembly comprising in combination:
   a body member;
   an elongated rigid leader pivotally connected at one end to said body member on a transverse pivot axis on said body member;
   connection means at the other end of said rigid leader for connection to a fishing line; and
   an elongated resilient element shorter in length than said rigid leader and connected at one end to said body member rearwardly of said transverse pivot axis and terminally connected to said connection means at the other end.

2. The assembly as claimed in claim 1 in which said body member has a substantially flat under surface.

3. The assembly as claimed in claim 2 in which said body member includes a transverse, forward bore defining said transverse pivot axis, said rigid leader comprising a forward bridle pivotally connected in said transverse bore.

4. The structure as claimed in claim 3 in which said bridle overlies said body member and disposes said rigid leader at an acute angle when said bridle is pivoted rearwardly onto the body member, said leader having a normal arcuate set, said resilient element normally being taut from said body member to the distal end of said leader.

5. The assembly as claimed in claim 3 in which said body member includes a wide rear end, and a forward tapered end, the upper surface of the body member being rounded.

* * * * *